US012379919B2

(12) United States Patent
Sandler et al.

(10) Patent No.: US 12,379,919 B2
(45) Date of Patent: Aug. 5, 2025

(54) CONTAINERIZED MODELING OF DEVICE UPDATES OR MODIFICATIONS VIA DIGITAL TWINS

(71) Applicant: Rockwell Automation Technologies, Inc., Mayfield Heights, OH (US)

(72) Inventors: Nathaniel S. Sandler, Chagrin Falls, OH (US); Rob A Entzminger, Shawnee, KS (US); David C. Mazur, Mequon, WI (US); Bruce T. McCleave, Jr., Mission Viejo, CA (US); Jonathan Alan Mills, Mayfield Heights, OH (US); Patrick E. Ozimek, Mequon, WI (US); Tim S. Biernat, Franklin, WI (US); Michael J. Anthony, Milwaukee, WI (US); Chris Softley, Midlothian (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/402,423

(22) Filed: Jan. 2, 2024

(65) Prior Publication Data

US 2024/0134630 A1    Apr. 25, 2024

Related U.S. Application Data

(63) Continuation of application No. 17/953,783, filed on Sep. 27, 2022, now Pat. No. 11,880,676.

(51) Int. Cl.
*G06F 8/65* (2018.01)
*G06F 9/4401* (2018.01)

(52) U.S. Cl.
CPC ..................... *G06F 8/65* (2013.01)

(58) Field of Classification Search
CPC ............... G06F 8/65; G06F 9/4411; G06F 2009/45562; G06F 2009/45575; G06F 2009/45579; G06F 9/45558
See application file for complete search history.

(56) References Cited

U.S. PATENT DOCUMENTS 9,870,219 B1 * 1/2018 Manthiramoorthy ... G06F 9/455
10,007,509 B1 * 6/2018 Qureshi .................. G06F 8/656
(Continued)

FOREIGN PATENT DOCUMENTS

EP         3761564 A1     1/2021
KR    20200027783 A      3/2020
(Continued)

OTHER PUBLICATIONS

EP Extended European Search Report (EESR) for European Application No. 23198197.8 mailed Nov. 23, 2023.
(Continued)

*Primary Examiner* — Daxin Wu
(74) *Attorney, Agent, or Firm* — Fletcher Yoder, P.C.

(57) ABSTRACT

A method may include receiving an indication of an available updated container. The method may also involve identifying one or more compute surfaces comprising a first container and a second container that correspond to the available container, such that the first container may control one or more operations of an operational technology (OT) device. The method may also include scheduling a deployment of the updated container to replace the second container, receiving expected output data associated with a digital model associated with the OT device, and scheduling a switchover of control of the one or more operations to the second container based on the expected output data.

20 Claims, 5 Drawing Sheets

(56) References Cited

U.S. PATENT DOCUMENTS

| | | | |
|---|---|---|---|
| 10,715,388 | B2 | 7/2020 | Fildebrandt et al. |
| 11,182,206 | B2 | 11/2021 | Jung et al. |
| 11,184,233 | B1* | 11/2021 | Neelakantam ...... G06F 11/3034 |
| 11,237,892 | B1* | 2/2022 | Kedlaya .............. G06F 11/0793 |
| 11,474,873 | B2 | 10/2022 | Biernat et al. |
| 11,513,877 | B2 | 11/2022 | Biernat et al. |
| 11,550,562 | B2* | 1/2023 | Jozsa .................... G06F 9/455 |
| 2009/0276482 | A1* | 11/2009 | Rae ....................... G06F 40/18 709/201 |
| 2017/0177860 | A1* | 6/2017 | Suarez .................. G06F 21/53 |
| 2018/0024537 | A1 | 1/2018 | Chauvet et al. |
| 2018/0054469 | A1 | 2/2018 | Simoncelli |
| 2019/0377604 | A1 | 12/2019 | Cybulski |
| 2020/0034178 | A1* | 1/2020 | Gupta ................ G06F 9/45558 |
| 2020/0136906 | A1 | 4/2020 | Bernat et al. |
| 2020/0249928 | A1 | 8/2020 | Zeng et al. |
| 2020/0278892 | A1 | 9/2020 | Nainar et al. |
| 2020/0311617 | A1 | 10/2020 | Swan et al. |
| 2021/0089354 | A1 | 3/2021 | Nixon et al. |
| 2021/0200814 | A1 | 7/2021 | Tal et al. |
| 2021/0208576 | A1* | 7/2021 | Muenzel .......... G05B 19/41885 |
| 2021/0218617 | A1 | 7/2021 | Palavalli et al. |
| 2021/0382727 | A1 | 12/2021 | Vigil et al. |
| 2022/0027721 | A1 | 1/2022 | Thoemmes et al. |
| 2022/0091572 | A1 | 3/2022 | Biernat et al. |
| 2022/0129606 | A1* | 4/2022 | Sundararajan .......... G06F 30/27 |
| 2022/0197306 | A1* | 6/2022 | Cella ....................... G06N 20/10 |
| 2022/0229651 | A1* | 7/2022 | Wu ....................... H04L 41/082 |
| 2022/0269496 | A1* | 8/2022 | Haldar ................ G06F 11/1433 |
| 2022/0404786 | A1* | 12/2022 | Amaro, Jr. ......... G05B 19/0421 |
| 2022/0404811 | A1* | 12/2022 | Amaro, Jr. ....... G05B 19/41835 |
| 2022/0404812 | A1* | 12/2022 | Amaro, Jr. ....... G05B 19/4188 |
| 2023/0214246 | A1* | 7/2023 | Darji .................... G06F 9/5077 718/1 |

FOREIGN PATENT DOCUMENTS

| | | |
|---|---|---|
| KR | 20220109175 A | 8/2022 |
| WO | 2020184362 A1 | 9/2020 |

OTHER PUBLICATIONS

Extended European Search Report for European Patent Application No. 21179775.8, dated Nov. 25, 2021, 9 pages.

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

* cited by examiner

CONTAINERIZED MODELING OF DEVICE UPDATES OR MODIFICATIONS VIA DIGITAL TWINS

CROSS REFERENCE TO RELATED APPLICATION

This application is a continuation of U.S. patent application Ser. No. 17/953,783, entitled "CONTAINERIZED MODELING OF DEVICE UPDATES OR MODIFICATIONS VIA DIGITAL TWINS," filed Sep. 27, 2022, which is incorporated herein by reference in its entirety.

BACKGROUND

The present disclosure generally relates to systems and methods for employing a container orchestration system to perform certain updates and/or modifications to devices operating within an operational technology (OT) or an industrial platform. More particularly, embodiments of the present disclosure are related to systems and methods for leveraging container orchestration systems to coordinate update operations for OT devices.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems operate in the OT environment are used to control industrial devices accessible via an OT network. Although the industrial control systems may be used to manage the operations of the devices within the OT network, improved systems and methods for operating devices within the OT network are desirable. For example, certain technologies available in the information technology (IT) environment may provide certain industrial control system users additional management tools that they employ for operating their IT assets. Indeed, in some cases, improved technologies may allow devices within the OT network to perform certain update operations in a more efficient and effective manner.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include a plurality of devices that may perform a plurality of operations within an industrial automation system, such that each of the plurality of devices may include a compute surface that may execute a respective container. The system may also include a processor that may receive a request to update firmware of a first container of a plurality of containers associated with performing operations related to one device of the plurality of devices and identify a second container of the plurality of containers performing digital twin operations of the first container. The processor may then update one or more properties of the second container based on the update and transfer operations from the first container to the second container after the one or more properties are updated.

In another embodiment, a method may include receiving an indication of an available updated container. The method may also involve identifying one or more compute surfaces comprising a first container and a second container that correspond to the available container, such that the first container may control one or operations of an operational technology (OT) device. The method may also include scheduling a deployment of the updated container to replace the second container, receiving expected output data associated with a digital model associated with the OT device, and scheduling a switchover of control of the one or more operations to the second container based on the expected output data.

In a further embodiment, a non-transitory computer-readable medium may include instructions that, when executed by processing circuitry, cause the processing circuitry to perform operations including receiving an indication of an available updated container. The operations may also involve identifying one or more compute surfaces comprising a first container and a second container that correspond to the available container, such that the first container may control one or operations of an operational technology (OT) device. The operations may also include scheduling a deployment of the updated container to replace the second container, receiving expected output data associated with a digital model associated with the OT device, and scheduling a switchover of control of the one or more operations to the second container based on the expected output data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
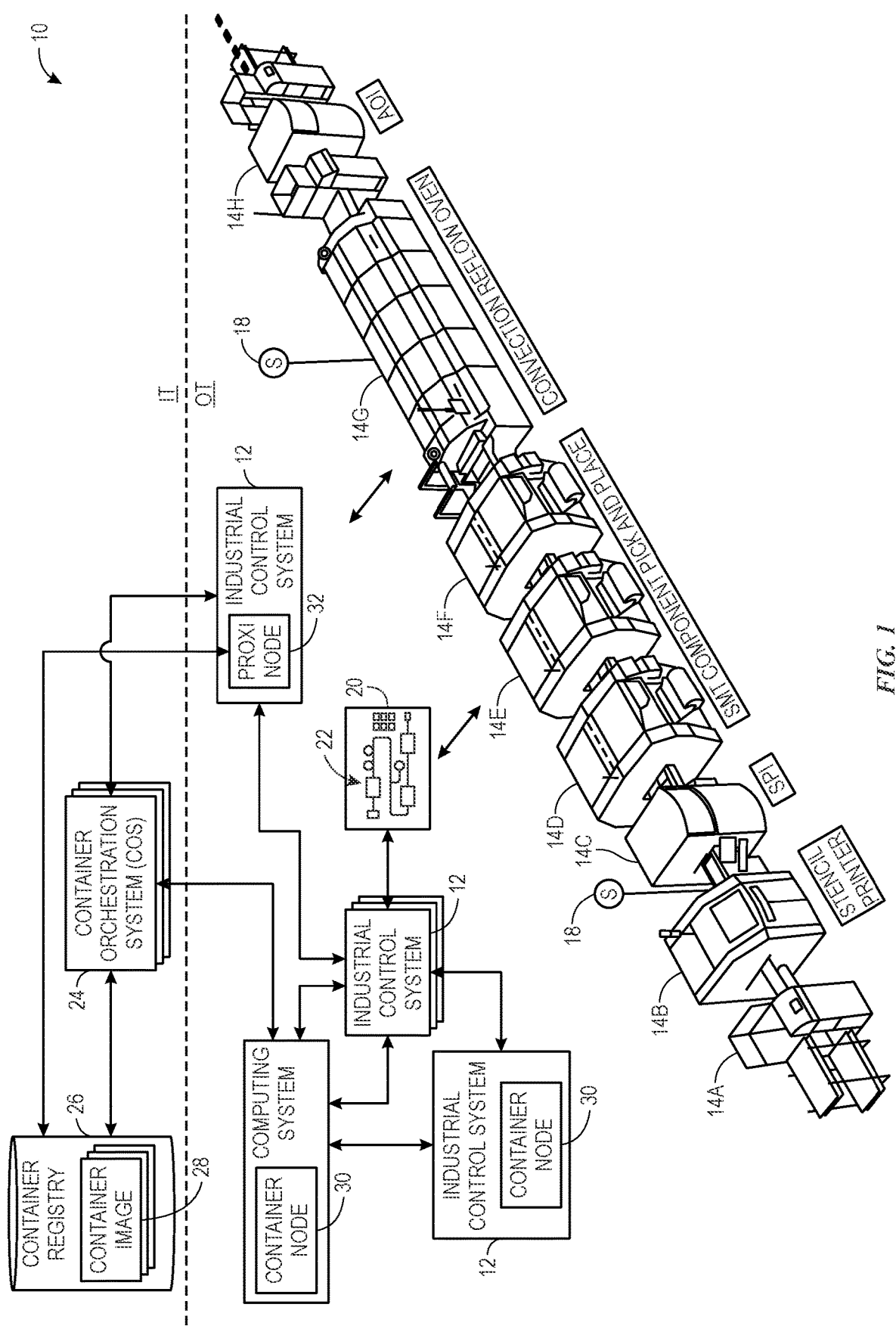
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed toward using containers to perform device updates or modifications on digital twin containers that mimic the operations performed by respective OT devices. As devices operate within industrial systems, operators or clients are often hesitant to perform firmware or software updates that may potentially cause the respective devices to go offline. To alleviate customer hesitancy to update firmware in certain devices, parallel containers may be operating simultaneously on available compute surfaces to perform operations that may control device operations. One of the two containers may control the device operations, while the second container may operate as a digital twin container performing the same functions without actually interfacing with the respective device. In some embodiments, a firmware update may be provided to the second container to test the functionality and integrity of the update. That is, an operator or user may test the update in the second container as a prototype, tune certain parameters related to the update, operate the firmware in a sandbox environment to test for optimization, and the like.

By including the second, parallel container, a digital twin may be implemented to operate on real data monitored by the respective devices. After confirming that the update does not cause the respective device to perform below certain thresholds, the user may send a request to the container orchestration system to switch over operations to the second container. Although the switchover may not be bumpless, the switch over may be scheduled at a time in which the devices may execute the switch. That is, the switch over may be performed at run time during time outs or other scheduled breaks. In some embodiments, the two containers may operate in different cores of a processor and may need access to two different memory components. In any case, after the switchover occurs, the first container may be updated with the same firmware update and operate as the digital twin. In this way, future updates may be tested on the first container and the switchover may cause the device controls to return to the first container.

In addition, the parallel container may be used to perform disaster recovery operations after detecting that a device or container has become inoperable. For instance, after detecting the inoperability of a device, the second container may record a minimum amount of data to obtain critical information that may be related to the operations of the device. In addition, the containers may collect information related to state information for the respective containers, compute spaces, machine states of the respective devices, or the like.

In another embodiment, the separate containers may distribute workload functions to horizontally scale operations across multiple containers. That is, multiple containers may perform portions of workloads associated with operating one or more devices. As a result, after detecting that one container becomes inoperable, the container deployment system may task the other container to perform the previous' container's operational tasks. Additional details with regard to employing parallel containers to perform various tasks will be discussed below with reference to FIGS. 1-7.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section. The conveyor section may transport the objects to a station 14B to perform a first action, such a printing solder paste to the substrate via stenciling. As objects exit from the station 14B, the conveyor section may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
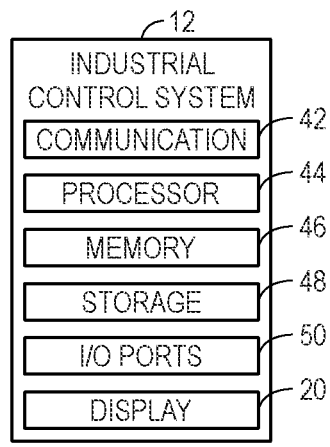
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
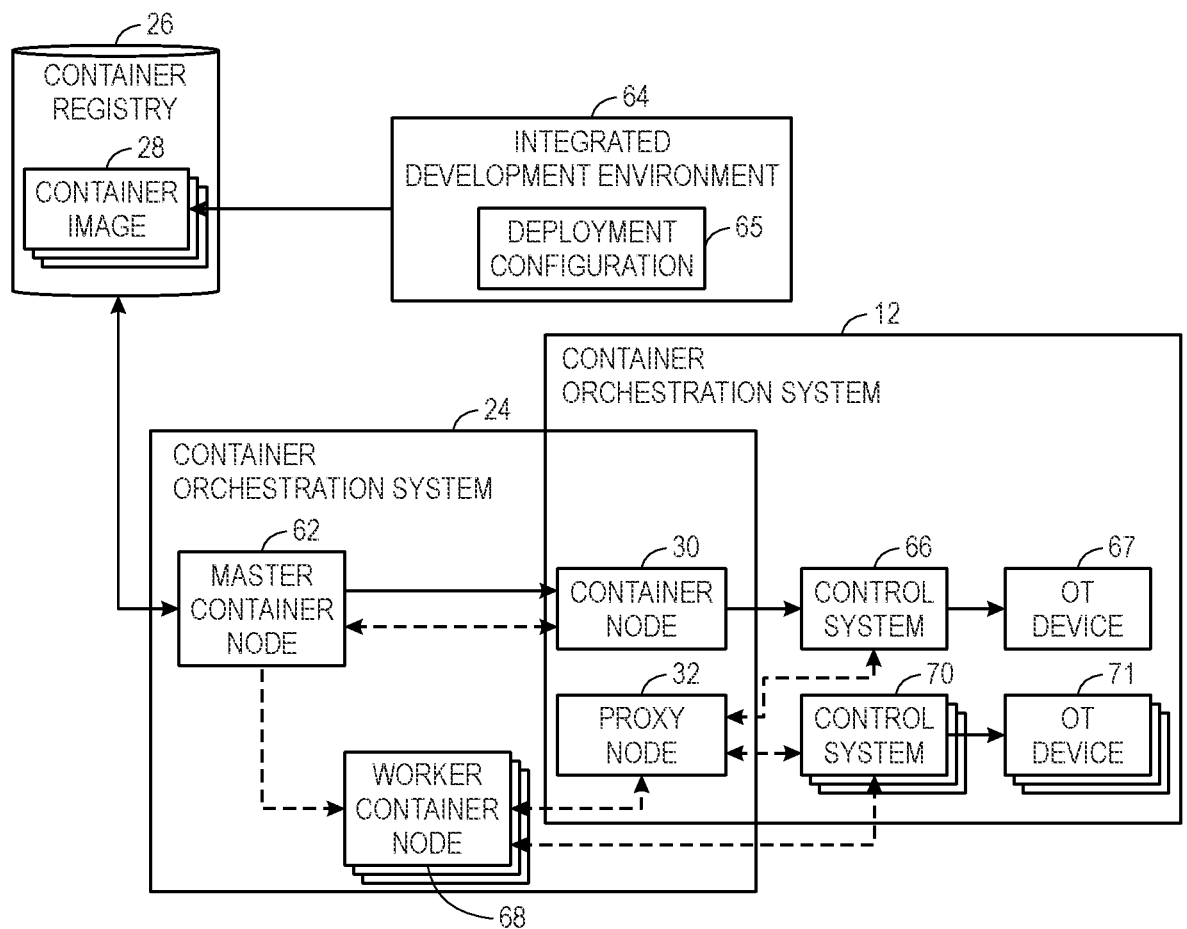
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resources controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may nm an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk Live Data, EtherNet/IP. Common Industrial Protocol (CIP), OPC Direct Access (e.g., machine to machine communication protocol for industrial automation developed by the OPC Foundation), or any suitable OT communication protocol (e.g., DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a proxy node agent that can register the industrial control system 12 with the master container node 62. For example, the industrial control system 12 may include a programmable logic controller (PLC) that cannot support an operating system (e.g., Linux) for receiving and/or implementing requested operations issued by the container orchestration system 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestrations system 24 and the OT-based industrial control system 12.

Figure 4:
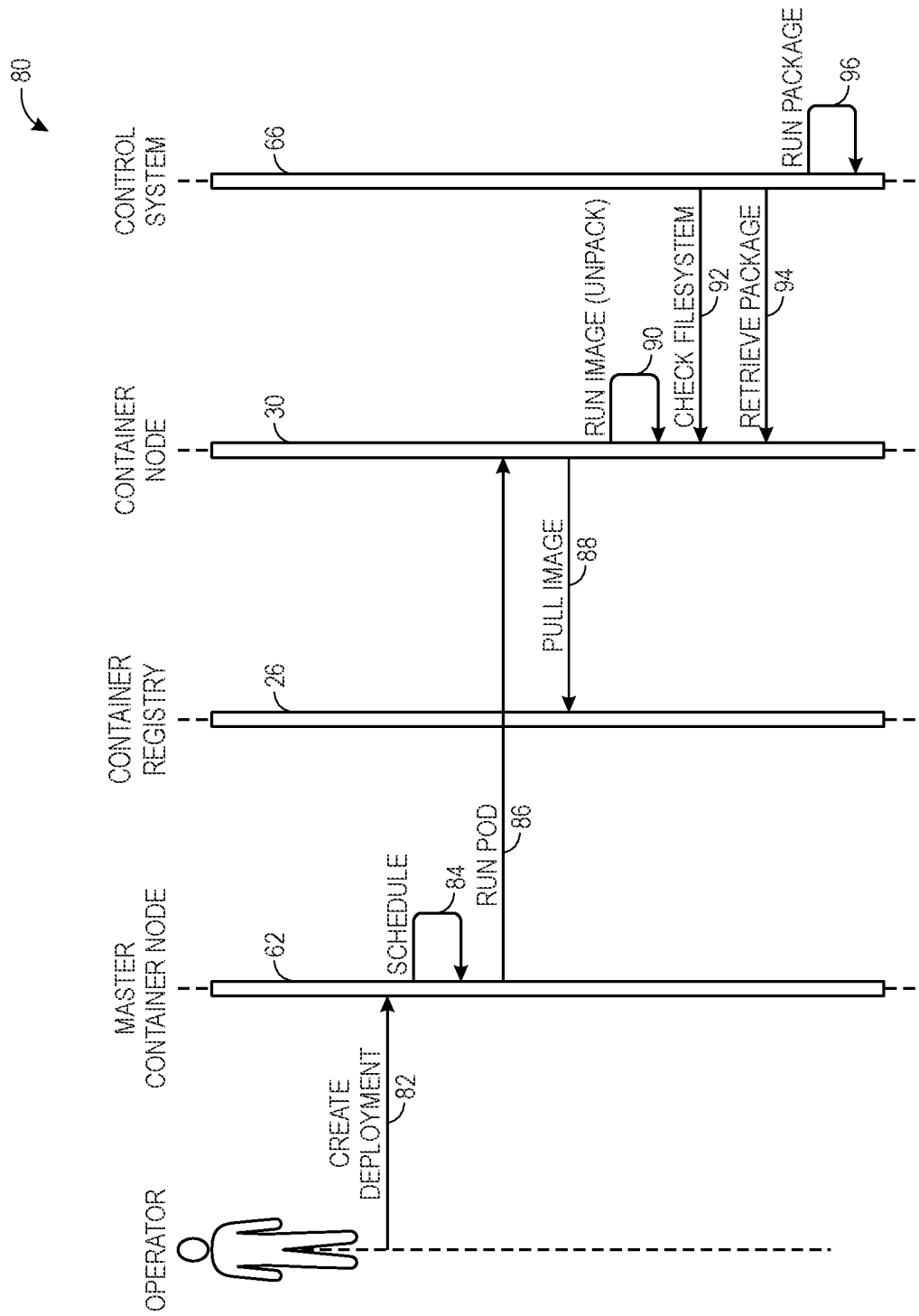
FIG. 4 is a data flow diagram illustrating the deployment of container pods to industrial control systems in the OT network of FIG. 3, in accordance with an embodiment.

FIG. 4 illustrates a data sequence diagram 80 that tracks the deployment of a container using the master container node 62 and the container node 30 described above with reference to FIG. 3. At step 82, the IDE tool 64 may create a deployment of the deployment configuration file 65 to the master container node 62. After receiving the deployment configuration file 65, the master container node 62 may identify a container node 30 that may fit the constraint specifications (e.g., memory, CPU availability) provided in the deployment configuration file 65. That is, the master container node 62 performs scheduling operations that involve checking the state data for each node of the container orchestration system 24, determining whether a suitable node exists for the constraints provided in the deployment configuration file 65, and the like.

After identifying the suitable container node, at step 84, the master container node 62 may schedule the deployment of the container to the respective container node 30. At step 86, the master container node 62 may deploy a pod to the container node 30, which may cause the container node 30 to retrieve a container image 28 from the container registry 26 at step 88. In this way, the container node 30 is configured to receive pods from the master container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the master container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the master container node 62. If the container node 30 sends an updated indicative of the package no longer executing the package, the master container node 62 may schedule deployment of another pod to another container node 30 for execution to maintain the desired state.

Figure 5:
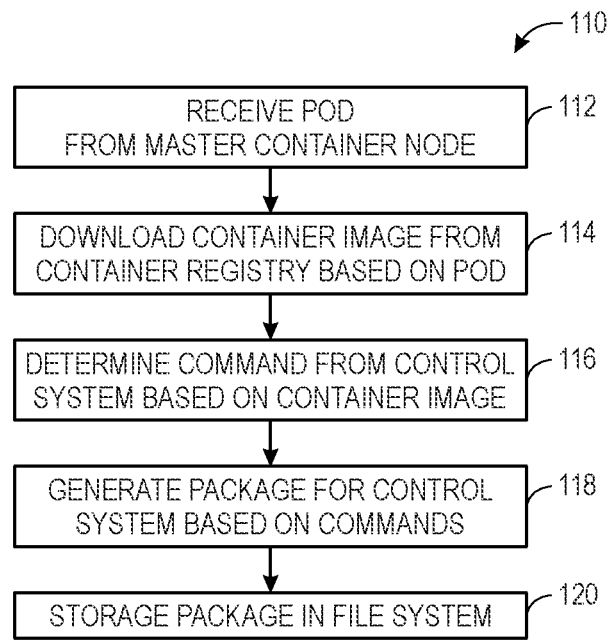
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the master container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the master container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the master container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the master container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g., ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the master container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the master container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the master container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the master container node 62 of the container orchestration system 24. To operate in the passive-direct mode, the container node 30 may include applications and/or APIs that interface directly with the control system 66 and the master container node 62. As such, the container node 30 may provide a bi-directional bridge of communication between the control system 66 and the master container node 62. In some embodiments, the container node 30 may include an API that translates the OT data received from the control system 66 into IT data that may be interpretable by the master container node 62. As such, the container node 30 may provide the master container node 62 with visibility into the operations and states of the OT devices 67 operating in the OT space.

Figure 6:
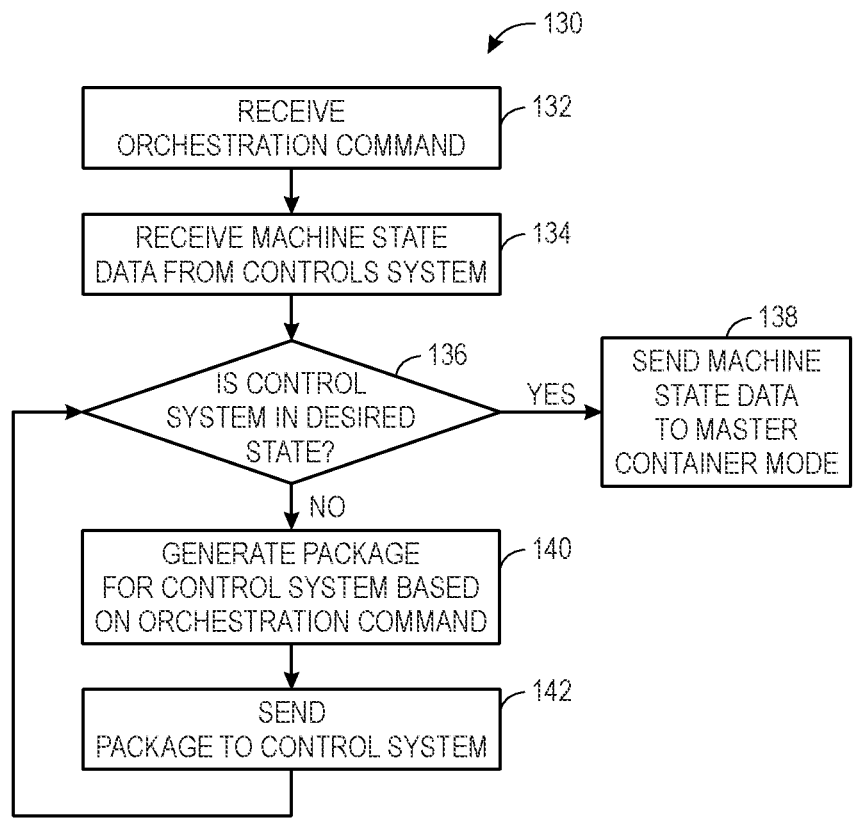
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the master container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the master container node 62 or the like and directly interface with the control system 66 to verify that the control system 66 is operating at the desired state.

Referring to FIG. 6, at block 132, the container node 30 may receive an orchestration command from the master container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive)

of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the master container node 62. The master container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operates in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 30 may generate an event notification that causes an API or other component of the control system 66 to react in response to detecting the event notification. In this way, the container node 30 may actively participate in the coordination of containers with a respective control system 66 based on orchestration commands received passively from the master container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the master container node 62 to extract relevant data (e.g., machine state data) to perform scheduling operations and to ensure that the container orchestration system 24 and the connected control systems 66 are operating at the desired state. Based on the results of its scheduling operations, the master container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

With the foregoing in mind, in some embodiments, the industrial control system 12 may include control systems (e.g., 66, 70) that may execute multiple containers using the available computing resources or surfaces of the respective control system. By way of example, the control system 66 of FIG. 3 may execute a device container that controls operations of the OT device 67 and an additional digital twin container that operates as a simulator or digital representation of the software executed by the device container. As such, although the digital twin container may receive the same inputs and perform the same operations as the device container, the digital twin container may provide outputs (e.g., control signals) to a model (e.g., digital twin model, digital model) or separate digital twin system that represents the load device or the OT device 67 connected to the control system 66. In this way, the digital twin container may simulate the effects of the process operations performed by the device container. It should be noted that the digital model of the OT device 67 may be implemented via a separate container deployed to the same or different computing surface as determined according to the master node container 62.

In addition, the digital twin container may serve as a failsafe container or redundant container to control the OT device 67 in the instance that the device container becomes inoperable. Although the digital twin container is described as being implemented in the control system 66, it should be noted that the digital twin container may be implemented in any available computing surface, as deployed by the master container node 62 in accordance with embodiments presented herein. In any case, the digital twin container is capable of being switched over as the device container to control the operations of the OT device 67.

With this in mind, the present embodiments described herein also allow the digital twin container to receive at test firmware and software updates before they are implemented on the device containers or made live for use on the OT device 67. That is, in some embodiments, the digital twin container may receive an updated container that may include a firmware update or a software update to the container image being executed via the device container. As mentioned above, customers of industrial automation systems may be hesitant to update software or containers fearing that the update could risk production, increase downtime, or the like. By employing the digital twin container to execute the updated firmware or software version of the container currently being used to control the OT device 67 via the device container, the present embodiments may allow a user to test the viability of the updated container based on expected effects observed on the digital twin load device due to updated outputs provided by the digital twin container.

In some embodiments, an operator may view the expected effects to the OT device 67 based on how the real time data inputs provided to the updated digital twin container affects the outputs provided by the digital twin or model of the OT device 67 as compared to the real outputs provided by the OT device 67. In this way, an operator may sandbox or test the update before making the updated software live and using it to control the OT device 67 (or other suitable devices). In some embodiments, the operator may make modifications or changes to the updated container and redeploy the updated container with the modifications to determine whether the newly updated container will achieve the desired results based on the outputs received from the digital twin or model of the OT device 67. After the updated container is approved by the operator, the digital twin container may be switched over to control the operations of the OT device 67 and may now operate as the device container. In the same manner, the computing resource executing the device container may be shut down or closed and replaced with the updated container that will now operate as the digital twin container. Additional details with regard to performing these tasks will be described below with reference to FIG. 7.

As mentioned above, FIG. 7 illustrates a flow chart of a method 150 for scheduling a deployment of updated container images for digital twin containers that may be operating on some computing surface in accordance with embodiments presented herein. Although the following description of the method 150 is described as being performed by the master container node 62, it should be noted that any suitable computing system or container node may perform the embodiments described herein in conjunction with the container orchestration system 24. Moreover, although the method 150 is described in a particular order, it should be noted that the method 150 may be performed in any suitable order and is not limited to the order detailed below.

Figure 7:
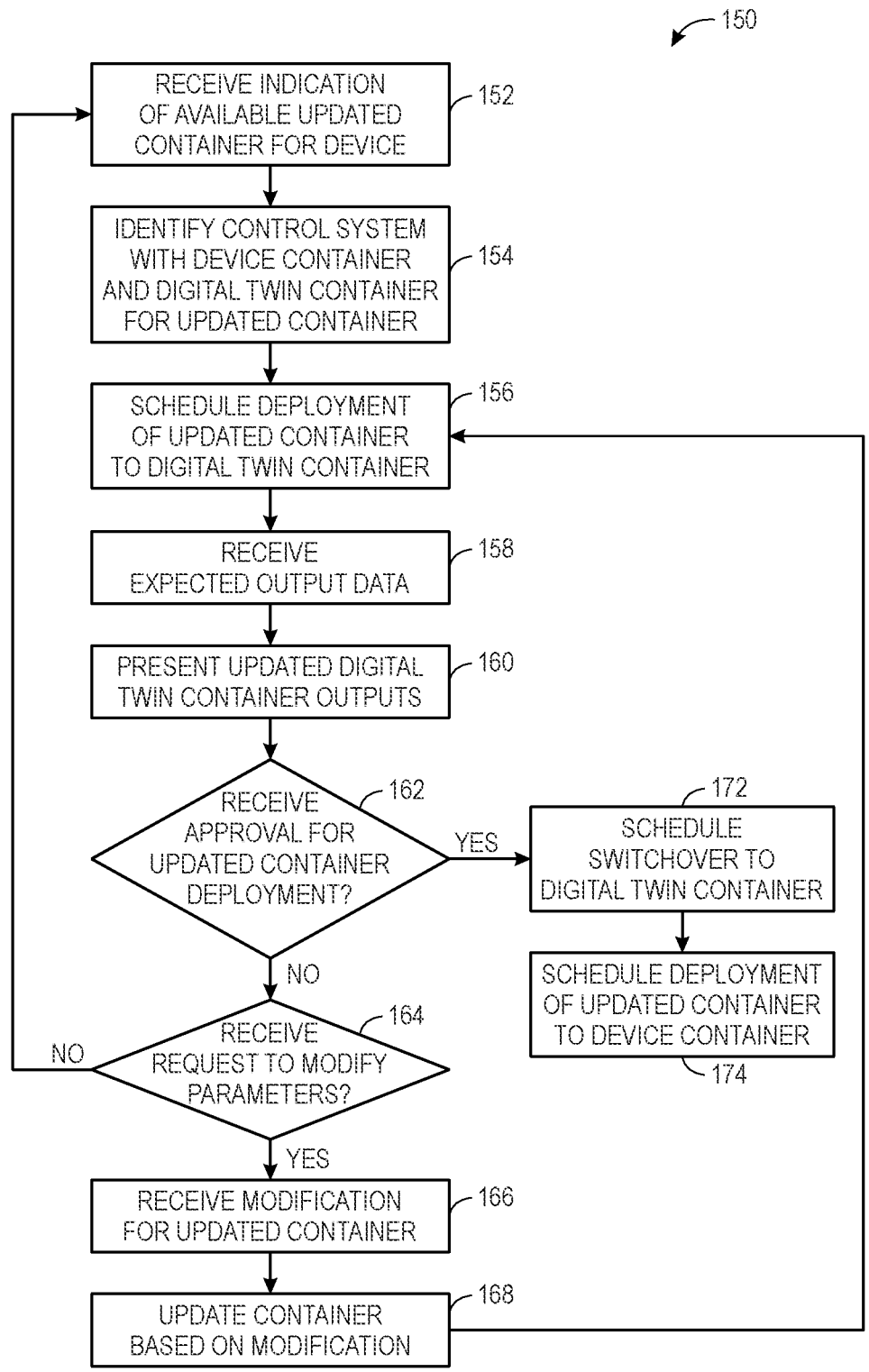
FIG. 7 is a flow chart of a method for update operations for devices within the OT network using the container orchestration system, in accordance with an embodiment.

Referring now to FIG. 7, at block 152, the master container node 62 may receive an indication related to an updated container being available for a device, such as the OT device 67. The master container node 62 may receive the indication via a subscription service that provides updates or messages in response to the container images 28 stored in the container registry 26 being updated, replaced, or the like. In some embodiments, the indication may be sent from a user or operator that wishes to update an existing container being used to operate the OT device 67.

At block 154, the master container node 62 may identify a control system or computing surface that may include a device container and/or a digital twin container that corresponds to the updated container. In some embodiments, the master container node 62 may maintain a list or registry of deployed containers and the respective computing surfaces or control systems that may be executing the deployed containers. The updated containers may include metadata that indicates a type of container, software operation, a type of OT device 67, or other suitable type of information that may assist the master container node 62 in identifying the compute surfaces that are executing corresponding or previous versions of the update container. To allow the operator the ability to test the effects of the updated container, the master container node 62 may identify the computing surfaces or control systems that are currently executing the digital twin container for the respective OT device 67.

After identifying the appropriate computing surface or control system that is executing the digital twin container, the master container node 62 may schedule a deployment of the updated container, which may be stored as a container image 28 on the container registry 26, to the identified computing surface or control system. As such, the master container node 62 may wind down or uninstall the digital twin container currently being executed on the computing surface and deploy the updated container to the same computing surface to operate as the digital twin container. As such, the master container node 62 may generate a pod that may be sent to the appropriate container node available on the identified computing surface as described above in FIG. 4.

Upon receiving the package containing the updated container image, the container node that received the pod instantiate and execute the updated container image as the updated digital twin container. As mentioned above, the digital twin container may receive inputs from sensors, I/O modules, or other components that are also provided to the device container employed to control operations of the OT device 67. However, instead of controlling the OT device 67, the digital twin container may be coupled to a digital twin model or simulator that corresponds to the OT device 67. As such, the digital twin model for the OT device 67 may include functions, output tables, or simulation software that mimic or produced expected outputs for the actual OT device 67 when provided the control commands from the digital twin container. The digital twin container may receive the outputs from the digital twin model and store the results in a storage component or the like.

In some embodiments, the digital twin container may include the digital twin model for the OT device 67 to allow for more efficient processing. In other embodiments, the digital twin model for the OT device 67 may be executed on another suitable computing surface as determined by the master container node 62.

Keeping this in mind and referring back to FIG. 7, at block 158, the master container node 62 may receive expected output data associated with the digital model from the digital twin container, the digital model, or the like. The expected output data may provide details related to the efficacy and effectiveness of the updated container image being executed to control the OT device 67 without risking actual control changes. At block 160, the master container node 62 may present the expected output data to a user via a display, a message, audio output, or other suitable output to allow the operator to consider the expected effects of the updated container on the operations of the OT device 67. In some embodiments, the master container node 62 may also present a comparison between the expected output data and the actual output data as detected or measured by the device container currently controlling the operations of the OT device 67. As such, the operator may determine whether there are any noticeable changes to the operations of the OT device 67 based on the expected output data received from the digital model of the OT device 67 operating based on the digital twin container.

At block 162, the master container node 62 may determine whether an approval of the deployment of the updated container image is received. In some embodiments, the master container node 62 may receive an indication of the approval from a computing device or other suitable device associated with the operator. In other embodiments, the master container node 62 may automatically determine that the updated container deployment is received in response to the expected output data being within a threshold percentage or amount of the actual output data for the OT device 67.

If the approval for the updated container deployment is not received, the master container node 62 may proceed to block 164 and determine whether a request to update parameters associated with the updated container image is received. In some embodiments, at block 162, the master container node 62 may present a request to the operator to approve the deployment of the updated container, modify the updated container, or the reject the deployment of the updated container. If the operator provides the request to modify parameters of the updated container image, the master container node 62 may proceed to block 166 and receive modifications to the updated container. In some embodiments, the updated parameters may be related to operational tasks or functions performed by the respective updated container. In some cases, the master container node 62 may present the functions of the updated container in the integrated development environment 64 to allow the operator to make the desired changes. The modifications may allow the operator to tune the functions or operations of the updated container to operate more effectively with the digital model of the OT device 67, the OT device 67, other components related to the operation of the OT device 67, or the like.

Based on the received modifications, the master container node 62 may, at block 168, generate an updated container image with the modification and store the newly updated container image in the container registry 26. The master container node 62 may then return to block 156 and schedule the deployment of the newly updated container image to the digital twin container.

Returning to block 164, if the master container node 62 does not receive the request to modify parameters, the master container node 62 may return to block 152 and await receiving another indication of an available updated container image. Alternatively, the master container node 62 may send an error message to the computing device associated with the operator, the integrated development environment, other suitable computing devices, a display accessible to the operator, or the like. The error message may provide an indication that the updated container approval was not approved, an indication of a difference between the expected output data and the actual output data being greater than a threshold, an indication of the incompatibility of the updated container, and the like.

Referring back to block 162, if the master container node 62 receives the approval for the updated container deployment, the master container node 62 may proceed to block 172 and schedule the switchover of the control of the OT device 67 to the digital twin container that corresponds to the updated container. In some embodiments, the master container node 62 may monitor the machine state of the OT device 67 to determine a suitable time to switch over operations from the device container to the digital twin container. The machine state may indicate an operational status (e.g., idle, operating, steady state) of the OT device 67. Certain machine states such as idle or off may be suitable to allow the digital twin container to assume control of the OT device 67 during a switchover operation. That is, the master container node 62 may modify output parameters of the digital twin container to be routed to the OT device 67 instead of the digital model of the OT device 67. In some embodiments, the master container node 62 may wind the currently executing device container and digital twin container down and re-instantiate the digital twin container with the outputs routed to the OT device 67 (e.g., control system 66 for operating the OT device 67).

Additionally, at block 174, the master container node 62 may schedule the deployment of the updated container image onto the computing surface that previously executed the device container, such that a redundant updated container is operating for the OT device 67. In this way, the previous device container may now operate as and be designated as the digital twin container, while the previous digital twin container may operate as and be designated as the device container.

In addition to providing updates to deployed containers, the present embodiments include providing disaster recovery operations using the redundant container after detecting that a device or device container has become inoperable. For instance, after detecting the inoperability of the OT device 67, the digital twin container may record or store a certain amount of data to obtain critical information that may be related to the operations of the OT device 67. In addition, the digital twin container may collect information related to state information for the respective containers, compute spaces, machine states of the respective devices, or the like to assist the master container node 62, the control system 66, or other suitable device to maintain data that may be relevant to determine a root cause or identify an issue related to the device or the device container becoming inoperable.

As mentioned above, the digital twin container may operate as a failsafe container that may perform the same operations as the device container. With this in mind, if the device container becomes inoperable, the digital twin container may retrieve data that may be received within a range of time prior to determining that the device container has become inoperable. In this way, data that may have been corrupted or may be inaccessible via the device container may be accessible via the digital twin container that monitors and receives the same input data as the device container.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a plurality of devices configured to perform a plurality of operations within an industrial automation system, wherein each of the plurality of devices comprises a compute surface configured to execute a respective container of a plurality of containers of a container orchestration system;
a processing system configured to:
receive an indication of inoperability of a device of the plurality of devices, the device associated with a first container of the plurality of containers configured to control one or more operations of the device;
identify a second container of the plurality of containers performing digital twin operations of the first container in response to receiving the indication, wherein the second container is configured to store data associated with a period of time preceding the indication of inoperability;
receive the data from the second container;
identify one or more additional operations of the device associated with the inoperability of the device based on the data;
identify a cause associated with the indication of inoperability based on the one or more additional operations of the device; and
transfer the control of the one or more operations of the device to the second container.

2. The system of claim 1, wherein the processing system is configured to execute a master container node configured to schedule deployment of the first container, the second container, or both to a respective compute surface.

3. The system of claim 1, wherein the data comprises state information of the first container, state information of the compute surface, machine state data associated with the device, or any combination thereof.

4. The system of claim 1, wherein the indication of inoperability is associated with inoperability of the first container.

5. The system of claim 4, wherein the second container is configured to retrieve the data in response to receiving the indication of inoperability.

6. The system of claim 1, wherein the processing system is configured to:
retrieve a plurality of machine state datasets associated with a plurality of computing nodes of the container orchestration system;
identify a computing node of the plurality of computing nodes to host the second container based on the plurality of machine state datasets; and
cause deployment of the second container to the computing node, wherein the second container is configured to replace the first container.

7. The system of claim 1, wherein the plurality of devices comprises at least one operational technology device configured to operate within an operational technology network.

8. The system of claim 1, wherein the first container is deployed on a first computing surface and the second container is deployed on a second computing surface.

9. The system of claim 8, wherein the first computing surface is different from the second computing surface.

10. A method, comprising:
receiving, via a processing system, an indication of inoperability of an operational technology (OT) device of a plurality of OT devices, wherein the indication of inoperability is associated with inoperability of one or more operations of a first container;
in response to receiving the indication of inoperability, identifying, via the processing system, one or more compute surfaces of a plurality of computing surfaces comprising the first container and a second container that correspond to the OT device, wherein the first container is configured to control one or more operations of the OT device and the second container is configured to perform digital twin operations of the first container;
receiving, via the processing system and from the second container, data associated with the indication of inoperability of the OT device, wherein the second container is configured to retrieve the data in response to the indication of inoperability, the data associated with a period of time preceding the indication of inoperability;
identifying, via the processing system, a cause associated with the inoperability of the first container based on the data; and transferring, via the processing system, the control of the one or more operations of the OT device to the second container.

11. The method of claim 10, wherein the data comprises state information of the first container, state information of a compute surface of the plurality of computing surfaces associated with the first container, machine state datasets associated with the OT device, or any combination thereof.

12. The method of claim 10, comprising:
receiving, via the processing system, a plurality of machine state datasets associated with the plurality of computing surfaces;
identifying, via the processing system, an additional computing surface of the plurality of computing surfaces as a suitable host for the second container based on the plurality of machine state datasets; and
scheduling, via the processing system, a deployment of the second container to the additional computing surface.

13. The method of claim 10, wherein the indication of inoperability is associated with inoperability of the OT device, and wherein the second container is configured to store the data in response to the indication of inoperability, and wherein the method comprises:
identifying, via the processing system, one or more additional operations of the OT device associated with the inoperability of the OT device based on the data.

14. A non-transitory computer-readable medium comprising instructions that, when executed by processing circuitry, cause the processing circuitry to perform operations comprising:
receiving an indication of inoperability of an operational technology (OT) device of a plurality of OT devices;
in response to receiving the indication of inoperability, identifying a first container configured to perform one or more first operations of a digital model associated with the OT device;
retrieving data associated with the indication of inoperability of the OT device from the first container, the data associated with a period of time preceding the indication of inoperability;
identifying a cause associated with the indication of inoperability based on the data, wherein the data comprises state information of the device, state information of a compute surface associated with a device container, or machine state datasets associated with the OT device; and
transferring one or more second operations of the OT device from the device container to the first container.

15. The non-transitory computer-readable medium of claim 14, wherein the instructions cause the processing circuitry to perform the operations comprising:
receiving a plurality of machine state datasets associated with a plurality of computing surfaces;
identifying a first computing surface of the plurality of computing surfaces as a suitable host for the first container based on the plurality of machine state datasets; and
scheduling a deployment of the first container to the first computing surface, wherein the first container is configured to replace the device container.

16. The method of claim 10, comprising executing, via the processing system, a master container node configured to schedule deployment of the first container, the second container, or both to a respective compute surface.

17. The method of claim 10, wherein the OT device is configured to operate within an operational technology network.

18. The non-transitory computer-readable medium of claim 14, wherein the instructions cause the processing circuitry to perform the operations comprising executing a master container node configured to schedule deployment of the first container, the device container, or both to a respective compute surface.

19. The non-transitory computer-readable medium of claim 14, wherein the OT device is configured to operate within an operational technology network.

20. The non-transitory computer-readable medium of claim 14, wherein the first container is deployed on a first computing surface and the device container is deployed on a second computing surface different from the first computing surface.

* * * * *